March 13, 1956  L. E. NORTON  2,738,470
SEALED-OFF MICROWAVE GAS CELL
Filed Nov. 17, 1950
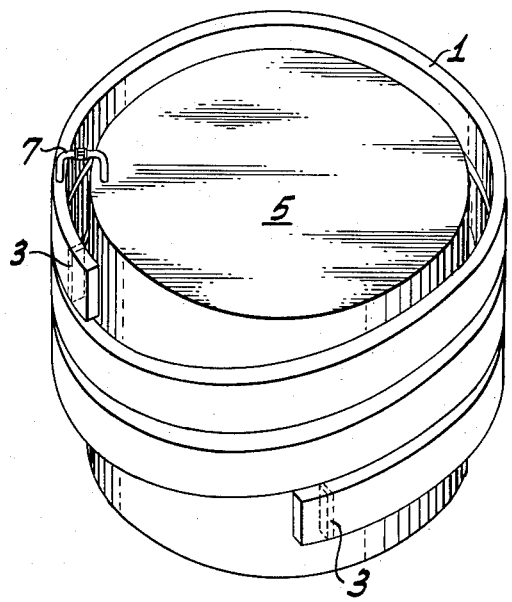
INVENTOR
Lowell E. Norton
BY
*J. L. Whittaker*
ATTORNEY United States Patent Office 2,738,470
Patented Mar. 13, 1956

2,738,470
SEALED-OFF MICROWAVE GAS CELL

Lowell E. Norton, Princeton, N. J., assignor to Radio Corporation of America, a corporation of Delaware Application November 17, 1950, Serial No. 196,144

6 Claims. (Cl. 333—98)

This invention relates generally to the use of a microwave resonant absorbing gas for frequency stabilization of microwave generators, and more particularly to the maintenance of a relatively constant partial gas pressure in a sealed microwave absorptive gas cell.

A copending application of William Delmar Hershberger, Serial No. 786,736, filed November 18, 1947, now U. S. Patent No. 2,702,350 issued February 15, 1955, describes methods and means employed to utilize the molecular resonant absorption characteristics of a microwave absorptive gas, at reduced pressures, to stabilize the frequency of microwave generators. In said copending application, energy is coupled from a microwave generator into a waveguide having a gas-tight chamber at one end. In this same waveguide energy is also coupled to a directional coupler waveguide through a pair of apertures spaced one-quarter wavelength apart, at the operating frequency. Energy flows along the waveguide into one end of the sealed gas cell where a part of this microwave energy is absorbed. The remaining energy passes out the other end of the sealed gas cell where it is detected by a crystal detector. The output of this detector is amplified and an output is developed across a plate load resistor. Energy also flows along the waveguide through the apertures in the guide into the directional coupler waveguide where a part of its energy is detected by another crystal detector and applied to a second amplifier. The output circuits of the two amplifiers have a common load resistor. A control signal is obtained from this common load resistor and applied to a frequency control element to stabilize the microwave generator frequency.

It is necessary to maintain a constant partial pressure of the microwave absorbing gas in the sealed microwave absorptive cell. The microwave absorbing gas may comprise, for example, ammonia, carbonyl sulphide, or methylamine. In operation the pressure in the cell is not greater than $10^{-1}$ mm. of mercury. At such a pressure the number of microwave absorbing gas molecules would be relatively small compared to the molecules existing in the cell at atmospheric pressure. Absorption of some molecules by the porosity or capillary action of the walls of the cell diminishes the partial pressure. In addition to this effect, adsorption of the gas to the cell walls and chemical reactions between the microwave absorbing gas and unknown elements in the cell reduces the number of gas molecules available for absorbing microwave energy. The combination of these effects reduces the pressure in the sealed cell after the cell is sealed off, to such an extent that the stability of the standard frequency defined by the absorption line is affected.

An object of the instant invention is to maintain a gas in a sealed gas cell at a constant partial pressure.

A further object of this invention is to maintain a gas in a sealed gas cell at a constant partial pressure when the gas is subject to absorption by and adsorption to the cell walls or subject to chemical reaction with unknown elements in the sealed gas cell.

Major difficulties encountered in maintaining a sealed gas cell at a constant partial pressure involve (1) the choice of a suitable material for the cell walls and (2) the physical shape of the gas cell. The choice of the cell wall material is dictated largely by the electromagnetic energy transmission characteristics of the cell wall material. Selection of a coating of glass, for example, applied to the cell walls might very well reduce absorption by and adsorption to these walls, but electromagnetic energy transmission would be almost entirely attenuated before the energy traveled a fractional part of the length of the sealed cell. Choice of stainless steel for the cell walls has proved very satisfactory, since this alloy conducts the microwave energy with only moderate losses and does not absorb or adsorb the resonant gas as much as do other metals. In choosing a shape for the gas cell, it is not desirable to have too large a cross-sectional area since spurious resonances and modes at the microwave transmission frequency then become troublesome. To obtain sufficient absorption of the microwave energy, the length of the sealed gas cell must be rather long. By having a long conductive cell such as a waveguide with a small cross-sectional area, the ratio of cell wall surface area for absorption and adsorption to the enclosed volume of microwave absorbing gas is very unfavorable.

The instant invention solves the difficulties due to partial gas pressure variation by replacing gas molecules lost in the sealed gas cell through absorption, adsorption, and chemical reactions, with other microwave absorbing gas molecules that are maintained in a relatively large volume storage reservoir.

The invention will be described by referring to the accompanying drawing wherein the single figure is a perspective view of a cylindrical storage reservoir enclosed by a microwave absorptive cell wound in helical form around the storage reservoir.

The microwave conductive sealed gas cell 1 comprises a rectangular waveguide transmission line that is made gas-tight by a pair of microwave-permeable windows 3.

If the enclosed volume $V_1$ of the sealed gas cell 1 is pumped to a low pressure and gas of volume $V_2$ is admitted to the cell 1, in the absence of absorption by or adsorption to the cell walls, the final pressure is, $$P = a\frac{V_2}{V_1}P_0 \qquad (1)$$

where $P_0$ is a constant dimensional factor and $a$ is a constant proportionality factor.

At constant pressure and temperature, the gas volume absorbed by and adsorbed to the cell walls is substantially proportional to the wall area exposed to the gas.

Hence this volume is, $$v = A_1 v_0 \qquad (2)$$

where $A_1$ is the cell wall surface area and $v_0$ is the adsorption-absorption volume per unit area.

Recognizing that cell wall absorption and adsorption do exist, the equilibrium pressure of the enclosed gas is, $$P_1 = a\frac{V_2 - A_1 v_0}{V_1}P_0 \qquad (3)$$

where $P_1$ is the equilibrium pressure.

The dependence of $P_1$ on the surface-to-volume ratio of the sealed gas cell is therefore, $$\frac{dP_1}{d\left(\frac{A_1}{V_1}\right)} = -av_0P_0$$

or the differential pressure change is, $$dP_1 = -av_0P_0 d\left(\frac{A_1}{V_1}\right) \qquad (4)$$

This differential pressure change causes undesirable changes in absorption of energy by the gas, thereby changing the effective Q (ratio of line frequency to line width) of the cell, and this differential pressure also causes a small shift in the frequency of maximum absorption, so it is essential to keep $dP_1$ as small as is possible.

Referring to Equation 4, a solution to this problem is to decrease the surface area exposed-to-volume enclosed ratio $$\left(\frac{A_1}{V_1}\right)$$

and to reduce absorption-adsorption volume per unit area.

A relatively large volume storage reservoir 5 of microwave absorbing gas is coupled to the sealed cell 1, the reservoir 5 having a minimum area-to-volume ratio. The gas flows from the reservoir 5 through a short metallic connecting conduit 7, of diameter much smaller than the cut-off wavelength at the operating frequency, and into the gas cell 1. The small cross-sectional dimensions of the connecting conduit 7 greatly attenuates energy coupling from the gas cell 1 into the reservoir 5, thereby effectively isolating the reservoir from the gas cell for microwave energy. Reduction of adsorption and absorption in the storage reservoir is reduced by use of a wall material less affected by these phenomena. A material such as glass may be used, in this instance, where the electromagnetic energy in the storage reservoir 5 is small and the energy losses would be negligible.

A storage reservoir 5, cylindrical (having a small length to diameter ratio) or spherical in shape, best meets the qualification of a minimum exposed surface-area to maximum enclosed-volume ratio. Theoretical considerations urge the use of a spherical reservoir, but practical considerations, for example when using a helical gas cell, generally would make a cylindrical reservoir more satisfactory. The volume $V_3$ of the reservoir 5 is $bV_1$ where $b \gg 1$, and a new value of adsorption-absorption volume per unit area for the enclosed volume $(V_1 + bV_1)$ is $v_0'$, where $v_0' \ll v_0$. Also, the surface-volume ratio of the reservoir having a volume $V_3$, $$\frac{A_3}{V_3} = \frac{A_3}{bV_1}$$

is made much less than the ratio $$\frac{A_1}{V_1}$$

Hence Equation 4 becomes, $$dP_1 = -av_0' P_0 d\left(\frac{A_1 + A_3}{(1+b)V_1}\right) \quad (5)$$

With $v_0' \ll v_0$ and $$\frac{A_1 + A_3}{(1+b)V_1} \ll \frac{A_1}{V_1}$$

the differential pressure of the microwave absorbing gas is more nearly constant and changes in absorption line frequency shift, band width, and magnitude are greatly reduced thereby improving microwave frequency stability.

What I claim to be my invention is:

1. Apparatus for maintaining a gas at a constant partial pressure in a sealed gas cell when said gas is subject to at least one of the following chemical reactions with elements within said cell, absorption by the walls of said gas cell, and adsorption to the walls of said gas cell, including a sealed cell having a waveguide type of structure and containing a microwave resonant absorptive gas at a pressure not greater than $10^{-1}$ millimeters of mercury, a storage reservoir for said gas having an inner surface with a porosity which is low compared to the porosity of the inner surface of said sealed cell and having a volume substantially greater than the volume of said sealed cell, and conduit means connected between said cell and said reservoir for continuously supplying gas to said cell and maintaining said partial gas pressure constant in said cell said conduit means providing high attenuation to microwave energy at the frequency of said microwave resonant absorption.

2. Apparatus according to claim 1 wherein said conduit means functions as a cut-off waveguide at the frequency of said microwave resonant gas absorption frequency and as a flow path for said resonant gas.

3. Apparatus according to claim 1 wherein the inner surface of said reservoir comprises a material substantially impervious to adsorption and absorption of said gas.

4. Apparatus according to claim 1 wherein said sealed gas cell is made gas-tight by a pair of microwave permeable windows forming the ends of said cell.

5. A system as claimed in claim 1 wherein said partial gas pressure is maintained constant at a pressure of less than $10^{-1}$ millimeters of mercury.

6. Apparatus for maintaining a gas at a constant partial pressure in a sealed hollow structure including a metallic hollow electromagnetic wave energy structure when the molecules of said gas are subject to at least one of the following: absorption by the metallic walls of said hollow wave energy structure, adsorption to the metallic walls of said hollow wave energy structure, and chemical reactions with other elements within said hollow wave energy structure; said apparatus comprising, a metallic hollow electromagnetic wave energy structure containing a microwave resonant absorptive gas at a pressure not greater than $10^{-1}$ millimeters of mercury, a storage reservoir for said gas having an inner surface with a porosity which is low compared to the porosity of the inner surface of said hollow wave energy structure and having a volume substantially greater than the volume of said hollow wave energy structure, and conduit means connected between said hollow wave energy structure and said reservoir for continuously supplying gas to said hollow wave energy structure and maintaining said partial gas pressure constant in said hollow wave energy structure, said conduit means providing a high impedance to microwave energy at the frequency of said microwave resonant absorption.

References Cited in the file of this patent

UNITED STATES PATENTS

| | | |
|---|---|---|
| 2,487,547 | Harvey | Nov. 20, 1943 |
| 2,401,425 | Hershberger | June 4, 1946 |
| 2,457,673 | Hershberger | Dec. 28, 1948 |
| 2,471,744 | Hershberger | May 31, 1949 |
| 2,475,035 | Linder | July 5, 1949 |
| 2,602,858 | Hartley | July 8, 1952 |